(12) United States Patent
Ramsey et al.

(10) Patent No.: US 7,844,613 B2
(45) Date of Patent: Nov. 30, 2010

(54) DATA WAREHOUSE WITH OPERATIONAL LAYER

(75) Inventors: Mark S. Ramsey, Kihei, HI (US); David A. Selby, Nr Fareham (GB)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 11/337,983

(22) Filed: Jan. 24, 2006

(65) Prior Publication Data

US 2007/0174357 A1 Jul. 26, 2007

(51) Int. Cl.
*G06F 7/00* (2006.01)
(52) U.S. Cl. .................................................. 707/756
(58) Field of Classification Search .............. 707/203
See application file for complete search history.

(56) References Cited

U.S. PATENT DOCUMENTS

| | | | | |
|---|---|---|---|---|
| 4,575,827 A | * | 3/1986 | Kulakowski | 365/230.01 |
| 6,018,627 A | * | 1/2000 | Iyengar et al. | 717/103 |
| 7,020,697 B1 | * | 3/2006 | Goodman et al. | 709/223 |
| 7,024,431 B1 | * | 4/2006 | Kornelson et al. | 707/202 |
| 2003/0014335 A1 | * | 1/2003 | Lecheler-Moore et al. | 705/30 |
| 2003/0130899 A1 | * | 7/2003 | Ferguson et al. | 705/26 |
| 2005/0203887 A1 | * | 9/2005 | Joshi et al. | 707/3 |

* cited by examiner

*Primary Examiner*—Cam Y Truong
*Assistant Examiner*—Jensen Hu
(74) *Attorney, Agent, or Firm*—Anne L. Linne; Hoffman Warnick LLC

(57) ABSTRACT

A data warehouse having an operational layer is provided. The data warehouse stores historical data in an historical format that is based on operational data for an organization. The operational layer enables access to the historical data in an operational format that is used to store the operational data on which the historical data is based. The invention further provides a solution for managing the data warehouse with the operational layer. The operational layer can be incorporated in various solutions. To this extent, the invention further provides a solution for developing an application using the operational layer of the data warehouse.

21 Claims, 2 Drawing Sheets

DATA WAREHOUSE WITH OPERATIONAL LAYER

FIELD OF THE INVENTION

The invention relates generally to a data warehouse, and more particularly, to a data warehouse that includes an operational layer.

BACKGROUND OF THE INVENTION

In an enterprise, an operational environment generates operational data. After a period of time, e.g., thirty days, the operational data is transferred to a data warehouse for more permanent storage, historical reference, and/or the like. During this transfer, the operational data is translated from an operational format, which is conducive for implementing the relevant operations/transactions in the operational environment, to a historical format, which is conducive for summarization/reference. However, for some solutions, such as the development of one or more types of applications, using the historical format creates one or more inefficiencies. For example, currently, a data mining model is developed using the historical data in its historical format. When the data mining model is ready for deployment to an operational environment, it takes many man months, or even man years, to recreate the data mining model for use against the operational data in the operational format.

In view of the foregoing, there exists a need in the art to overcome one or more of the deficiencies indicated herein.

BRIEF SUMMARY OF THE INVENTION

The invention provides a data warehouse having an operational layer. The data warehouse stores historical data in an historical format that is based on operational data for an organization. The operational layer enables access to the historical data in an operational format that is used to store the operational data on which the historical data is based. The invention further provides a solution for managing the data warehouse with the operational layer. The operational layer can be incorporated in various solutions. To this extent, the invention further provides a solution for developing an application using the operational layer of the data warehouse.

A first aspect of the invention provides a method of managing a data warehouse, the method comprising: managing historical data stored in the data warehouse in an historical format, the historical data being based on operational data stored in an operational format; and generating a set of layers for the data warehouse, the set of layers including an operational layer that enables access to the historical data in the operational format.

A second aspect of the invention provides a method of developing an application, the method comprising: managing historical data stored in a data warehouse in an historical format, the data warehouse including an operational layer that enables access to the historical data in an operational format; and testing the application using the operational layer.

A third aspect of the invention provides a system for managing a data warehouse, the system comprising: a system for managing historical data stored in the data warehouse in an historical format, the historical data being based on operational data stored in an operational format; and a system for generating a set of layers for the data warehouse, the set of layers including an operational layer that enables access to the historical data in the operational format.

A fourth aspect of the invention provides a system for developing an application, the system comprising: a system for managing historical data stored in a data warehouse in an historical format, the data warehouse including an operational layer that enables access to the historical data in an operational format; and a system for testing the application using the operational layer.

A fifth aspect of the invention providees a data warehouse for storing historical data, the data warehouse: a set of layers including: a metadata layer for defining the data warehouse; an acquisition layer for transforming operational data in an operational format to historical data in a historical format; at least one presentation layer that enables access to the historical data in the historical format; and an operational layer that enables access to the historical data in the operational format.

A sixth aspect of the invention provides a method of deploying an application, the method comprising: providing a computer infrastructure operable to: manage historical data stored in a data warehouse in an historical format, the data warehouse including an operational layer that enables access to the historical data in an operational format; develop the application using the operational layer; and deploy the application to an operational environment, the operational environment comprising operational data in the operational format.

A seventh aspect of the invention provides a method of generating a system for managing a data warehouse and/or developing an application, the method comprising: providing a computer infrastructure operable to perform the process described herein.

An eighth aspect of the invention provides a business method for managing a data warehouse and/or developing an application, the business method comprising managing a computer infrastructure that performs the process described herein; and receiving payment based on the managing.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a data warehouse having an operational layer. The data warehouse stores historical data in an historical format that is based on operational data for an organization. The operational layer enables access to the historical data in an operational format that is used to store the operational data on which the historical data is based. The invention further provides a solution for managing the data warehouse with the operational layer. The operational layer can be incorporated in various solutions. To this extent, the invention further provides a solution for developing an application using the operational layer of the data warehouse. As used herein, unless otherwise noted, the term "set" means one or more (i.e., at least one).

Figure 1:
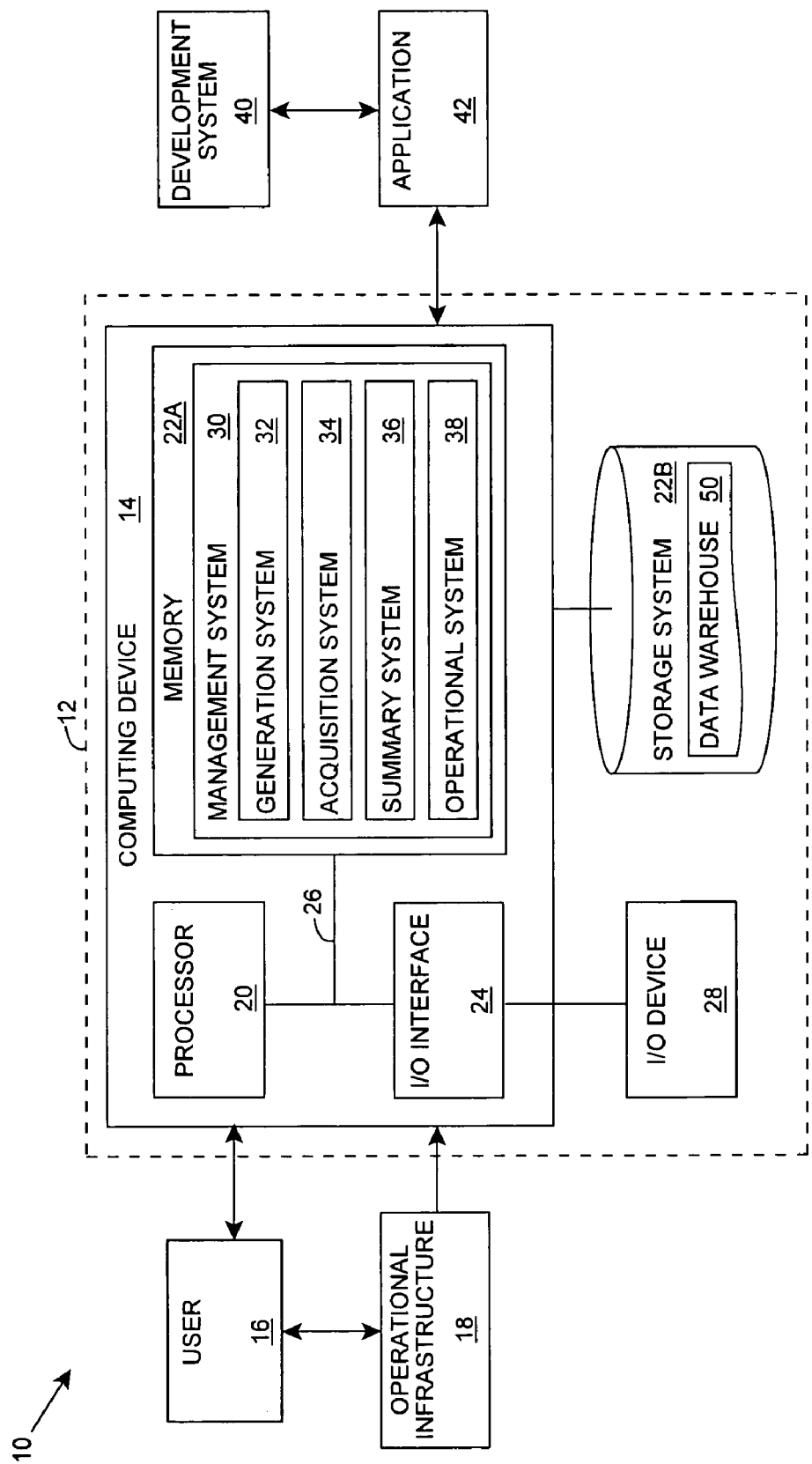
FIG. 1 shows an illustrative environment for managing a data warehouse according to an embodiment of the invention.

Turning to the drawings, FIG. 1 shows an illustrative environment 10 for managing a data warehouse 50 according to an embodiment of the invention. To this extent, environment 10 includes a data warehouse infrastructure 12 that can perform the process described herein in order to manage data warehouse 50. In particular, data warehouse infrastructure 12 is shown including a computing device 14 that comprises a management system 30, which makes computing device 14 operable to manage data warehouse 50 by performing the process described herein.

Computing device 14 is shown including a processor 20, a memory 22A, an input/output (I/O) interface 24, and a bus 26. Further, computing device 14 is shown in communication with an external I/O device/resource 28 and a storage system 22B. As is known in the art, in general, processor 20 executes computer program code, such as management system 30, which is stored in memory 22A and/or storage system 22B. While executing computer program code, processor 20 can read and/or write data, such as data warehouse 50, to/from memory 22A, storage system 22B, and/or I/O interface 24. Bus 26 provides a communications link between each of the components in computing device 14. I/O device 28 can comprise any device that enables an individual to interact with computing device 14 or any device that enables computing device 14 to communicate with one or more other computing devices using any type of communications link.

In any event, computing device 14 can comprise any general purpose computing article of manufacture capable of executing computer program code installed thereon (e.g., a personal computer, server, handheld device, etc.). However, it is understood that computing device 14 and management system 30 are only representative of various possible equivalent computing devices that may perform the process described herein. To this extent, in other embodiments, the functionality provided by computing device 14 and management system 30 can be implemented by a computing article of manufacture that includes any combination of general and/or specific purpose hardware and/or computer program code. In each embodiment, the program code and hardware can be created using standard programming and engineering techniques, respectively.

Similarly, data warehouse infrastructure 12 is only illustrative of various types of computer infrastructures for implementing the invention. For example, in one embodiment, data warehouse infrastructure 12 comprises two or more computing devices (e.g., a server cluster) that communicate over any type of communications link, such as a network, a shared memory, or the like, to perform the process described herein. Further, while performing the process described herein, one or more computing devices in data warehouse infrastructure 12 can communicate with one or more other computing devices external to data warehouse infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols.

As discussed herein, management system 30 enables data warehouse infrastructure 12 to manage data warehouse 50. To this extent, management system 30 is shown including a generation system 32, an acquisition system 34, a summary system 36, and an operational system 38. Operation of each of these systems is discussed further herein. However, it is understood that some of the various systems shown in FIG. 1 can be implemented independently, combined, and/or stored in memory for one or more separate computing devices that are included in data warehouse infrastructure 12. Further, it is understood that some of the systems and/or functionality may not be implemented, or additional systems and/or functionality may be included as part of data warehouse infrastructure 12.

Regardless, the invention provides a solution for managing data warehouse 50. As is known, data warehouse 50 comprises historical data for an organization. In general, the historical data in data warehouse 50 can be stored in an historical format that is designed for performing queries on large amounts of data. The historical format can support various queries on the historical data. For example, the historical format can enable the organization to obtain summaries of the activities/transactions of the organization over a period of time (e.g., monthly, quarterly, etc.). Further, the historical format can enable a query on a history for a particular client/customer, activities/transactions within a particular geographic area, and/or the like. Typically, the historical data in data warehouse 50 is static, and is updated only periodically, e.g., end of day, week, and/or the like.

The historical data in data warehouse 50 is based on operational data for the organization that is generated in an operational infrastructure 18. In contrast to the historical data, the operational data is stored in an operational format that facilitates the implementation of daily activities/transactions of the organization. To this extent, the operational data can be configured to support numerous queries on small amounts of data and is typically updated daily during the course of business for the organization. For example, the operational data can support a query on an account balance, a query on a shipping status for a pending order, a query on payment information for an order, and/or the like. To this extent, the operational data can include additional information that may not be stored in data warehouse 50. While the historical data is based on the operational data, the operations performed on the data differ substantially. As a result, the historical format of the historical data and the operational format of the operational data frequently differ substantially.

Figure 2:
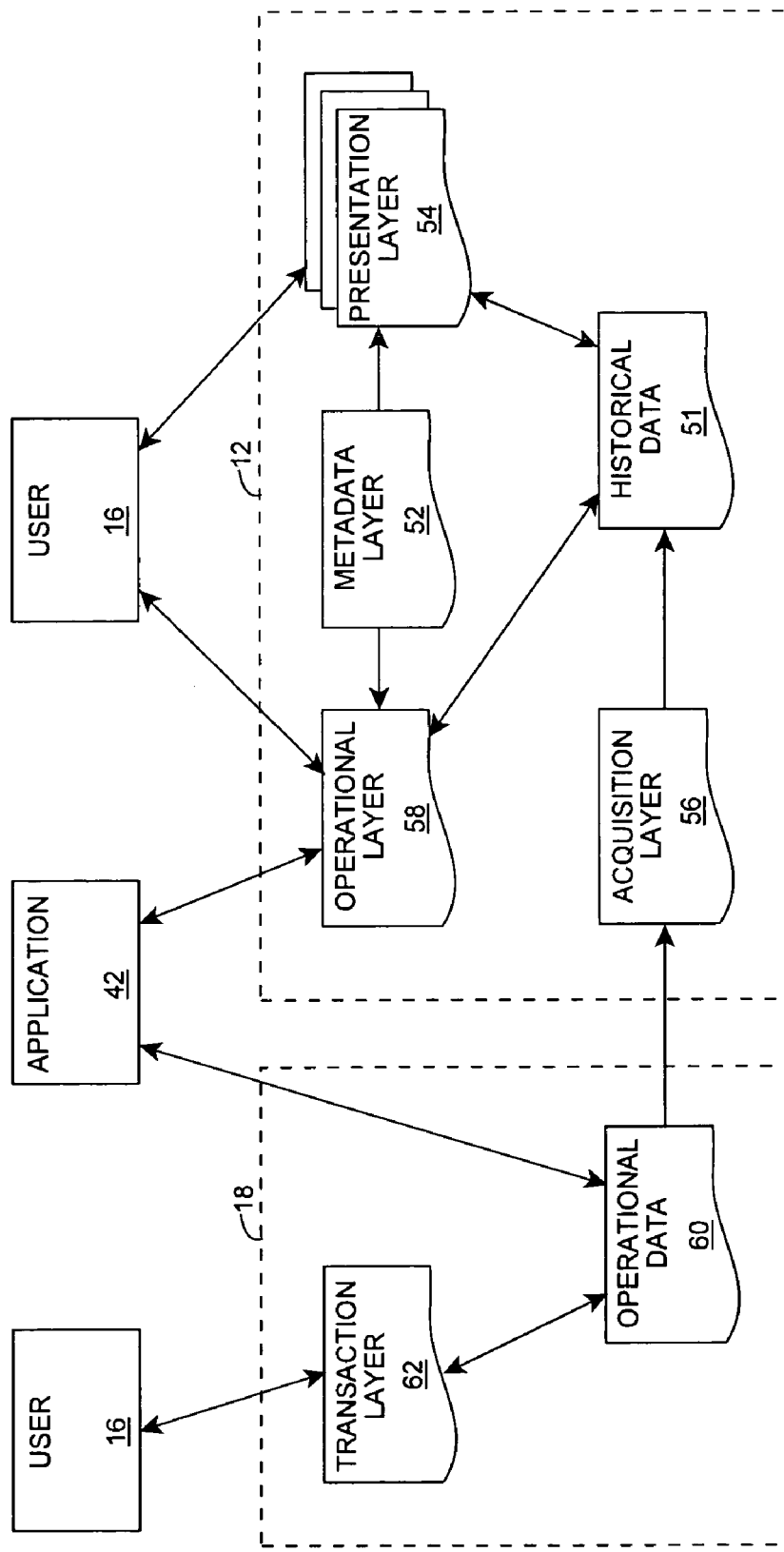
FIG. 2 shows a conceptual data flow between a computer infrastructure and an operational environment according to an embodiment of the invention.

FIG. 2 shows a conceptual data flow between data warehouse infrastructure 12 and operational infrastructure 18 according to an embodiment of the invention. Operational infrastructure 18 includes operational data 60 that is provided for use by a user 16 and/or received from user 16 using a transaction layer 62. Transaction layer 62 formats and/or stores operational data 60 in a manner that is conducive for generating, modifying, querying and/or viewing by user 16. As used herein, user 16 can comprise an individual, in which case operational infrastructure 18 can generate one or more displays for use by user 16, and/or user 16 can comprise another system, in which case operational infrastructure 18 can define an application program interface (API) or the like for use by user 16. In either case, user 16 can interact with operational infrastructure 18 over any type of communications link. In any event, user 16 can generate, query, modify, and/or the like operational data 60 using operational infrastructure 18.

After a period of time, older operational data 60 can be transferred for longer term storage as historical data 51 in data warehouse infrastructure 12. Referring to FIGS. 1 and 2, generation system 32 can generate a set of layers for data warehouse 50. Each layer in the set of layers can comprise one or more functions, systems, tables, relational database views, and/or the like, that store historical data 51 and/or other data in a manner that enables various functionality for use by management system 30, user 16, and/or the like. To this extent, generation system 32 can use a metadata layer (metadata management layer) 52 to generate one or more additional layers in data warehouse 50. Metadata layer 52 can define data warehouse 50. For example, metadata layer 52 can manage metadata for data warehouse 50, including mapping(s) between logic and physical models, authorization of data access, user security control, and/or the like.

Generation system 32 can generate one or more presentation layers 54 in data warehouse 50. Each presentation layer 54 can enable access to historical data 51 based on one or more requirements and/or access privileges of user 16 (an individual or a system). In general, each presentation layer 54 enables the selection and/or presentation of historical data 51 in a historical format. To this extent, each presentation layer 54 can define a unique selection and/or presentation of historical data 51 for use by user 16. Additionally, generation system 32 can generate an acquisition layer 56 for transforming operational data 60 into historical data 51. In particular, acquisition layer 56 can define various operations, such as one or more extractions, transformations, deletions, conversions, loads, and/or the like, which are required in transferring operational data 60, which is in an operational format, to historical data 51, which is stored in an historical format. For example, acquisition layer 56 can define a combination of various data items/fields in operational data 60 that are stored in records in different tables into a single record stored in a single table in historical data 51.

In operation, acquisition system 34 can receive operational data 60 from operational infrastructure 18, and can transform the operational data 60 to historical data 51 using acquisition layer 56 of data warehouse 50. Further, summary system 36 can receive a request for historical data 51 from user 16 (an individual or a system), and can provide historical data 51 for use by user 16 in response using one or more presentation layers 54. In this manner, data warehouse 50 provides an ability for an organization to store historical data 51 on its operations in a manner that is conducive for performing various historical analysis operations on historical data 51. It is understood that data warehouse 50 can include one or more additional layers, such as a design and modeling layer, which supplies required information to an existing business system, a data storage layer, which evaluates software and/or hardware requirements of data warehouse 50, and/or the like.

Data warehouse 50 can further include an operational layer 58 according to an embodiment of the invention. Operational layer 58 enables access to historical data 51 in the operational format. To this extent, operational layer 58 can "undo" one or more of the various operations performed by acquisition system 34 when transforming operational data 60 to historical data 51. Generation system 32 can generate operational layer 58 using metadata layer 52. In particular, generation system 32 can use the various mappings defined in metadata layer 52 to generate a set of operations required to represent historical data 51 in the operational format.

In one embodiment, operational layer 58 comprises one or more relational database views. Each relational database view comprises a temporary representation of historical data 51 that is created dynamically in response to a request from user 16, e.g., through the use of one or more select/join query operations in the standard query language (SQL). Once created, user 16 can perform various queries on the relational database view as if it were a relational database table. In any event, operational system 38 can receive a request from user 16 for historical data 51 in the operational format. In response to the request, operational system 38 can use operational layer 58 to obtain historical data 51 and provide historical data 51 for use by user 16. For example, operational system 38 can create one or more views defined by operational layer 58 and perform one or more queries against the view(s) to obtain historical data 51 for user 16. However, it is understood that this is only illustrative. To this extent, in alternative embodiments, operational layer 58 can comprise one or more User Defined Functions (UDFs), such as those available in the DB2 database manager provided by International Business Machines Corp. of Armonk, N.Y., automatic summary tables, and/or the like.

User 16 can use historical data 51 in the operational format for various purposes. In an embodiment of the invention, operational layer 58 is used in developing an application 42. To this extent, environment 10 includes a development system 40, which can implement functionality that enables the development of application 42. To this extent, development system 40 can comprise any type of software development platform that can be used to develop application 42 using any combination of one or more programming languages.

Application 42 may comprise an application that is to be deployed to operational infrastructure 18. To this extent, application 42 may perform various operations on operational data 60. While developing application 42, development system 40 can test application 42 using operational layer 58. For example, application 42 can be executed and perform various operations (e.g., queries) on operational layer 58 that are to be performed on operational data 60. Development system 40 analyze the results of each operation to determine whether application 42 performed the operation correctly. If not, application 42 can be modified based on the results.

As part of the development of some types of applications 42, such as a data mining model, development system 40 can further use operational layer 58 to train application 42. To this extent, application 42 can implement an intelligence-based data mining model that is to be used to perform various analyses on operational data 60. In this case, the data mining model can be trained using historical data 51 and subsequently deployed to operational infrastructure 18 for operation. By using operational layer 58, application 42 can perform the same queries during training as performed once deployed. In this manner, application 42 can be developed more efficiently than current solutions.

Once tested and/or trained, development system 40 can deploy application 42 to operational infrastructure 18. Once deployed, application 42 can perform various operations on operational data 60, which is stored in the operational format provided by operational layer 58. Further, the deployed application 42 could perform one or more operations on historical data 51 using one or more presentation layers 54 and/or operational layer 58. In any event, it is understood that the operational format provided by operational layer 58 need only be functionally the same as the operational format of operational data 60. To this extent, the operational format of operational data 60 and/or the operational format provided by operational layer 58 may comprise one or more additional data items/fields that are not used by application 42, which are not included in the other operational format.

While shown and described herein as a method and system for managing a data warehouse and/or developing an application, it is understood that the invention further provides various alternative embodiments. For example, in one embodiment, the invention provides a program product stored on a computer-readable medium, which when executed, enables a computer infrastructure to manage a data warehouse and/or develop an application. To this extent, the computer-readable medium can include program code, such as management system 30 (FIG. 1), which implements one or more of the processes described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22A (FIG. 1) and/or storage system 22B (FIG. 1) (e.g., a fixed disk, a read-only memory, a random access memory, a cache memory, etc.), as a data signal traveling over a network (e.g., during a wired/wireless electronic distribution of the program product), and/or the like.

In another embodiment, the invention provides a method of generating a system for managing a data warehouse and/or developing an application. In this case, a computer infrastructure, such as data warehouse infrastructure 12 (FIG. 1), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing device 14 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

In still another embodiment, the invention provides a business method that performs the process described herein on a subscription, advertising, and/or fee basis. That is, a service provider, such as an application service provider, could offer to manage a data warehouse and/or develop an application as described herein. In this case, the service provider can manage (e.g., create, maintain, support, etc.) a computer infrastructure, such as data warehouse infrastructure 12 (FIG. 1), that performs the process described herein for one or more customers. In return, the service provider can receive payment from the customer(s) under a subscription and/or fee agreement and/or the service provider can receive payment from the sale of advertising to one or more third parties.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the term "system" as used herein represents any combination of hardware and/or software capable of performing some function(s).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of managing a data warehouse, the method comprising:

managing historical data stored in the data warehouse in an historical format, the historical data being generated from operational data stored in an operational format using a first set of data operations, wherein the historical format comprises a data structure that is conducive for performing queries on the historical data and wherein the operational format comprises a different data structure that is conducive for facilitating transactions in an operational environment; and generating, by using a computer, a set of layers for the data warehouse, the set of layers including an operational layer that enables access to the historical data in the operational format, the operational layer including a second set of data operations configured to undo the first set of data operations to create a representation of the historical data in the operational format, wherein the generating uses a metadata later for the data warehouse and the metadata layer defines a plurality of mappings for the second set of data operations.

2. The method of claim 1, further comprising:

receiving operational data from an operational environment; and transforming the operational data to historical data using an acquisition layer of the data warehouse.

3. The method of claim 1, further comprising:

receiving a request for historical data in the operational format; and providing the representation of the historical data in the operational format in response to the request using the operational layer.

4. The method of claim 1, further comprising developing an application using the operational layer, wherein the application is to be deployed to the operational environment to perform operations on the operational data, the developing including performing operations on the representation of the historical data in the operational format using the application.

5. A method of developing an application, the method comprising:

managing historical data stored in a data warehouse in an historical format, the historical data being generated from operational data stored in an operational format using a first set of data operations, the data warehouse including an operational layer that enables access to a representation of the historical data in the operational format by a second set of data operations configured to undo the first set of data operations, wherein the historical format comprises a data structure that is conducive for performing queries on the historical data and wherein the operational format comprises a different data structure that is conducive for facilitating transactions in an operational environment, and wherein a metadata layer for the data warehouse defines a plurality of mappings for the second set of data operations; and testing the application using the operational layer, wherein the application is to be deployed to an operational environment to perform a set of data operations on the operational data, the testing including performing the set of data operations on the representation of the historical data in the operational format using the application.

6. The method of claim 5, further comprising deploying the tested application to the operational environment, the operational environment comprising operational data in the operational format.

7. The method of claim 5, wherein the application comprises a data mining model.

8. The method of claim 5, further comprising training the application using the operational layer, wherein the training includes performing data operations on the representation of the historical data in the operational format using the application.

9. A system for managing a data warehouse, the system comprising:
   at least one computer including a processor, the processor configured to implement a method including:
   managing historical data stored in the data warehouse in an historical format, the historical data being generated from operational data stored in an operational format using a first set of data operations, wherein the historical format comprises a data structure that is conducive for performing queries on the historical data and wherein the operational format comprises a different data structure that is conducive for facilitating transactions in an operational environment; and
   generating a set of layers for the data warehouse, the set of layers including an operational layer that enables access to the historical data in the operational format, the operational layer including a second set of data operations configured to undo the first set of data operations to create a representation of the historical data in the operational format, wherein the generating uses a metadata layer for the data warehouse and the metadata layer defines a plurality of mappings for the second set of data operations.

10. The system of claim 9, the method further comprising:
    receiving operational data from an operational environment; and
    transforming the operational data to historical data using an acquisition layer of the data warehouse.

11. The system of claim 9, the method further comprising:
    receiving a request for historical data in the operational format; and
    providing the representation of the historical data in the operational format in response to the request using the operational layer.

12. The system of claim 9, the method further comprising developing an application using the operational layer, wherein the application is to be deployed to the operational environment to perform operations on the operational data, the developing including performing operations on the representation of the historical data in the operational format using the application.

13. The system of claim 9, wherein the operational layer comprises at least one relational database view.

14. A system for developing an application, the system comprising:
    at least one computer including a processor, the processor configured to implement a method including:
    managing historical data stored in a data warehouse in an historical format, the historical data being transformed from operational data stored in an operational format using a first set of data operations, the data warehouse including an operational layer that enables access to a representation of the historical data in the operational format by a second set of data operations configured to undo the first set of data operations, wherein the historical format comprises a data structure that is conducive for performing queries on the historical data and wherein the operational format comprises a different data structure that is conducive for facilitating transactions in an operational environment, and wherein a metadata layer for the data warehouse defines a plurality of mappings for the second set of data operations; and
    testing the application using the operational layer, wherein the application is to be deployed to an operational environment to perform a set of data operations on the operational data, the testing including performing the set of data operations on the representation of the historical data in the operational format using the application.

15. The system of claim 14, the method further comprising deploying the tested application to the operational environment, the operational environment comprising operational data in the operational format.

16. The system of claim 14, wherein the application comprises a data mining model.

17. The system of claim 14, the method further comprising training the application using the operational layer, wherein the training includes performing data operations on the representation of the historical data in the operational format using the application.

18. A data warehouse for storing historical data, the data warehouse being embodied in at least one non-transitory computer-readable medium and the data warehouse comprising:
    a set of layers, the set of layers including:
    a metadata layer for defining the data warehouse;
    an acquisition layer for transforming operational data in an operational format to historical data in a historical format by performing a first set of data operations on the operational data;
    at least one presentation layer that enables access to the historical data in the historical format; and
    an operational layer that enables access to a representation of the historical data in the operational format by performing a second set of data operations on the historical data, wherein the second set of operations undo the first set of operations, wherein the historical format comprises a data structure that is conducive for performing queries on the historical data and wherein the operational format comprises a different data structure that is conducive for facilitating transactions in an operational environment, and wherein a metadata layer for the data warehouse defines a plurality of mappings for the second set of data operations.

19. The data warehouse of claim 18, wherein the operational layer comprises at least one relational database view.

20. A method of deploying an application, the method comprising:
    providing a computer infrastructure operable to:
    manage historical data stored in a data warehouse in an historical format, the historical data being transformed from operational data stored in an operational format using a first set of data operations, the data warehouse including an operational layer that enables access to a representation of the historical data in the operational format by a second set of data operations configured to undo the first set of data operations, wherein the historical format comprises a data structure that is conducive for performing queries on the historical data and wherein the operational format comprises a different data structure that is conducive for facilitating transactions in an operational environment, and wherein a metadata layer for the data warehouse defines a plurality of mappings for the second set of data operations;

develop the application using the operational layer, wherein the application is to be deployed to an operational environment to perform a set of data operations on the operational data, the developing including performing the set of data operations on the representation of the historical data in the operational format using the application; and deploy the application to the operational environment, the operational environment comprising operational data in the operational format.

21. The method of claim 20, wherein the computer infrastructure operable to develop includes a computer infrastructure operable to train the application using the operational layer, wherein the training includes performing data operations on the representation of the historical data in the operational format using the application.

* * * * *